United States Patent [19]
Justus et al.

[11] Patent Number: 5,656,815
[45] Date of Patent: Aug. 12, 1997

[54] THERMOLUMINESCENCE RADIATION DOSIMETRY USING TRANSPARENT GLASS CONTAINING NANOCRYSTALLINE PHOSPHOR

[75] Inventors: Brian L. Justus; Alan L. Huston, both of Springfield, Va.

[73] Assignee: The United States of America as represented by the Secretary of the Navy, Washington, D.C.

[21] Appl. No.: 598,677

[22] Filed: Feb. 8, 1996

[51] Int. Cl.$^6$ .................................................. G01T 1/11
[52] U.S. Cl. ............................................................... 250/337
[58] Field of Search ........................................... 250/337

[56] References Cited

U.S. PATENT DOCUMENTS

| | | | |
|---|---|---|---|
| 2,286,275 | 6/1942 | Hood et al. | 49/79 |
| 3,498,876 | 3/1970 | Tryggve et al. | 161/193 |
| 4,208,299 | 6/1980 | Oikawa et al. | 252/301.6 S |
| 4,278,731 | 7/1981 | Takenaga et al. | 252/301.4 R |
| 4,800,272 | 1/1989 | Harley et al. | 250/253 |
| 4,827,131 | 5/1989 | Moscovitch | 250/337 |
| 4,916,360 | 4/1990 | Mikami et al. | 313/503 |
| 5,309,071 | 5/1994 | Karam et al. | 313/509 |
| 5,446,286 | 8/1995 | Bhargava | 250/361 R |

OTHER PUBLICATIONS

Harshaw brochure Model 2080 TL Picoprocessor [USC1: 250/337].
Abdel-Kader et al., "Thermoluminescence dosimetry in the μGy range of neodymium-doped tellurite-phosphate glass", J. Materials Sci. 28 5133-37 (1993). No Month.
Justus et al., "Radiation dosimetry using thermoluminescence of semiconductor-doped Vycor glass", Nuclear Instruments & Methods in Physics Res. B95 533-36 (1995). No Month.
Nasipuri et al., "Energy storage behaviour of some binary alkali borate glasses by thermoluminescence studies", J. Materials Sci. 15 557-62 (1980). No Month.

*Primary Examiner*—Constantine Hannaher
*Attorney, Agent, or Firm*—Thomas E. McDonnell; John Karasek

[57] ABSTRACT

Radiation is detected using a light transparent thermoluminescent dosimeter that comprises a nanocrystalline phosphor dispersed in a light transparent glassy matrix, such as Vycor glass. The dosimeter is placed in an environment in which radiation is present for a period of time, removed from the environment and then heated to emit light, the intensity of which is indicative of the radiation dose. The method of the invention is useful for detecting and recording the dosage of both UV and ionizing radiation. In one embodiment in which the dosimeter is in the form of a flat plate. Ambient α or β radiation populates traps and, upon heating of the flat dosimeter, the emitted light is guided to the edges of the dosimeter by total internal reflection, where it is detected and recorded.

21 Claims, 3 Drawing Sheets

THERMOLUMINESCENCE RADIATION DOSIMETRY USING TRANSPARENT GLASS CONTAINING NANOCRYSTALLINE PHOSPHOR

CROSS-REFERENCE TO RELATED APPLICATIONS

This application is related to commonly assigned and copending U.S. patent application Ser. Nos. 08/371,305 and 08/371,306, titled ALL-OPTICAL, RAPID READOUT, FIBER-COUPLED THERMOLUMINESCENT DOSIMETER SYSTEM and GLASS MATRIX DOPED WITH ACTIVATED NANOCRYSTALLINE PARTICLES respectively, both of which were filed in the U.S. Patent and Trademark Office on Jan. 11, 1995, and which are incorporated by reference herein, in their entireties, for all purposes.

BACKGROUND OF THE INVENTION

1. Field of the Invention

The invention relates to radiation dosimetry using a nanocrystalline thermoluminescent phosphor in an inorganic, light transparent matrix. More particularly, the invention relates to thermoluminescence radiation dosimetry using a particulate, nanocrystalline phosphor, such as ZnS:Cu dispersed in a light transparent glassy matrix, which luminesces when heated (i.e., raised to a temperature above the ambient working temperature of the dosimeter) after being irradiated with UV or ionizing radiation.

2. Background of the Invention

Radiation dosimetry using thermoluminescent phosphors which accumulate and store energy when exposed to ionizing radiation and release the energy as luminescence when heated are simple, compact, reliable and relatively easy and inexpensive to use. This technology is extensively used for monitoring exposure to ionizing radiation, such as gamma and X-rays, in applications such as personnel protection, environmental monitoring and radiotherapy. Thermoluminescent dosimetry is based on the ability of a material exposed to ionizing radiation to absorb a portion of the ionizing radiation energy with a resultant promotion of valence band electrons to the conduction band of the material. Electrons in the conduction band migrate to trap sites that are energetically near, but below the conduction band energy. These trapped electrons remain trapped for extended periods of time. They can be promoted and released into the conduction band by thermal energy. Once in the conduction band the electrons migrate and recombine radiatively with trapped holes to release energy in the form of electromagnetic radiation in the visible light spectrum. The amount of light energy released by heating is related to the ionizing radiation exposure experienced by the material.

Thermoluminescent materials presently in use are particulate, inorganic, crystalline materials and are referred to as phosphors due to their ability to emit visible light radiation when suitably excited. These thermoluminescent phosphor materials are chips or microcrystalline size powders which are opaque and highly light scattering. This means that light generated within a layer of such phosphor particles has a smaller probability of reaching a photon detector than does light generated near the surface. The ideal thermoluminescent dosimeter material would be light transparent and have radiation collecting and light emitting ability which is a function of mass. The thermoluminescent properties of glasses, such as sodium silicate and alkali borate glasses and quartz doped with germanium, aluminum and copper sulfate, have been studied. However, none of the glass compositions studied have been found suitable for use in thermoluminescence radiation dosimetry. Therefore, it would be a significant improvement to the art if a thermoluminescent glass or glassy material could be found which is optically transparent and has the high sensitivity and long storage times of the crystalline thermoluminescent materials.

SUMMARY OF THE INVENTION

The present invention relates to the discovery of a thermoluminescent composite material useful as a radiation dosimeter which comprises a nanocrystalline thermoluminescent phosphor dispersed within an optically transparent matrix, and particularly a glassy matrix. The optical transparency of the glass permits the manufacture and use of thick composites as radiation dosimeters, since thermoluminescent (hereinafter "TL") light released within the bulk of the glass can pass through the glass to a light detector. The nanocrystalline size of the phosphor in the glass is small enough so that minimal light scattering of the emitted TL signal occurs. This combination of optical transparency and minimal light scattering results in substantially increased light detection and collection efficiency relative to phosphor powders or chips. The composite of the invention therefore eliminates many of the problems associated with prior art dosimeters, by combining the optical transparency and environmental protection of the phosphor associated with the use of a nanocrystalline phosphor encapsulated in a glass matrix, with the advantages obtained by using a crystalline TL phosphor material. The sensitivity of a dosimeter of the invention scales with mass due to the optical transparency of the glass, thereby enabling the manufacture and use of larger, and therefore more sensitive, dosimeters. In one embodiment the invention relates to a method of determining the absorbed dose of ultraviolet (UV) or ionizing radiation by exposing a dosimeter of the invention to such radiation for a predetermined period of time, followed by heating the irradiated dosimeter to produce a TL signal which is detected and measured, wherein the strength of the measured signal is directly related to the absorbed dose of the radiation to which the dosimeter has been exposed. In another embodiment the invention relates to a UV or ionizing radiation dosimeter comprising a nanocrystalline thermoluminescent phosphor dispersed within a continuous, optically transparent, glassy matrix. In still another embodiment the invention relates to a method of making a dosimeter of the invention. Still another embodiment relates to a TL dosimeter for detecting radiation in the form of $\alpha$ and $\beta$ particles which do not penetrate deeply. In this embodiment the dosimeter of the invention is in the form of a flat sheet or plate with parallel faces and at least a portion of the TL light generated is trapped by total internal reflection and guided to the edges for photo detection.

By nanometer size crystals what is meant is crystals or crystallites having an average particle size, expressed as an effective diameter (i.e., average diameter on a randomly selected axis), of less than 500 Å, preferably less than 250 Å, and still more preferably less than 100 Å. Suitable TL materials useful in the practice of the invention include any inorganic TL material which can be made into nanocrystalline size particles as defined herein and which can be made in or dispersed into an optically transparent, glassy matrix which does not adversely interfere with either the UV or ionizing radiation, or the emitted TL signal. Illustrative, but non-limiting examples of TL phosphors suitable for use in the practice of the invention include zinc sulfide (ZnS), doped with One or more activating metals such as copper (ZnS:Cu), lithium fluoride (LiF), doped with one or more activating metals such as titanium and magnesium (LiF:Ti, Mg); alkali halides doped With lanthanide metals such as Eu as an activator metal; alkali sulfates doped with Cu, and the like. In one embodiment of the invention a thermoluminescent composite material was made by impregnating porous glass with precursor solution of zinc and sulfur to form nanocrystals of ZnS, followed by impregnation with a copper precursor solution to deposit copper on the ZnS nanocrystals formed within the nano-size pores of the glass, followed by heating the composite to chemically reduce the copper 2+ ions and form the nanocrystalline, copper-activated, zinc sulfide phosphor ZnS:Cu in the pores. The heat treatment also partially collapsed the porous glass matrix, thereby sealing the ZnS:Cu nanocrystals inside the glass. This particular composite is useful for measuring ionizing radiation dosage received from many different sources and over a very broad range, ranging from ultraviolet (UV) through and including X-rays, alpha, beta, gamma and neutron radiation.

DETAILED DESCRIPTION OF THE PREFERRED EMBODIMENTS

Figure 1:
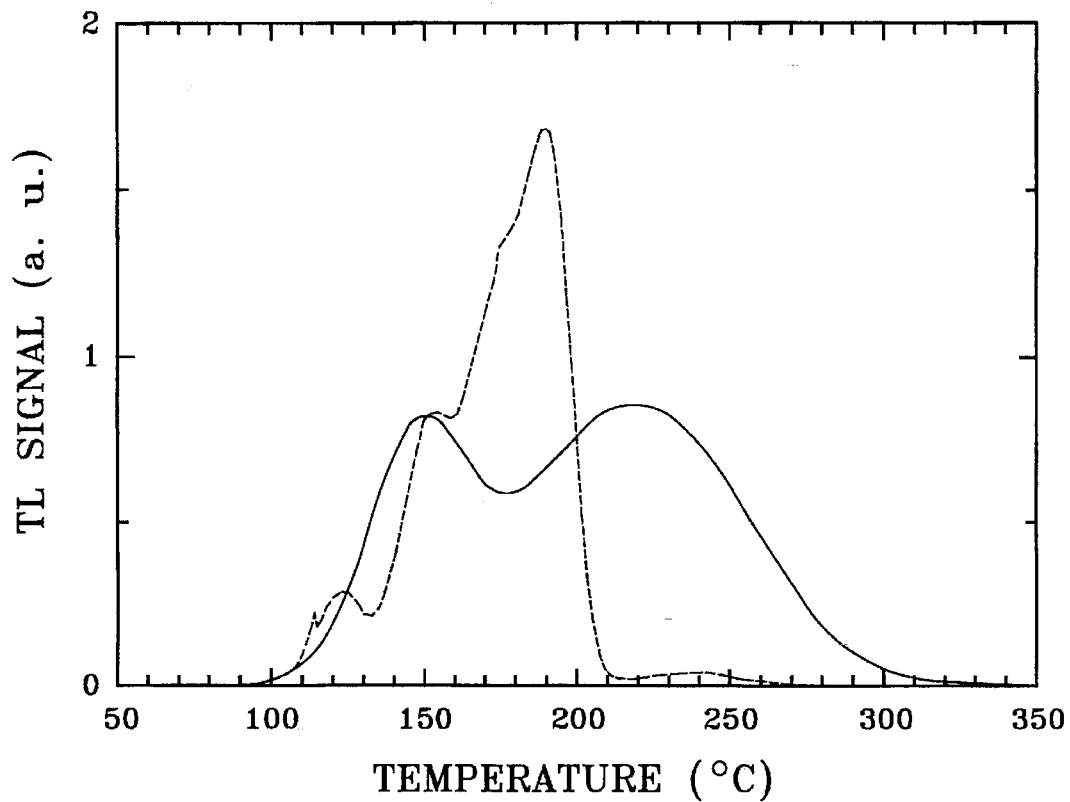
FIG. 1 is a graph of a thermoluminescent glow curve of a TL dosimeter of the invention and of a prior art dosimeter exposed to a gamma radiation.

Prior art TL dosimeters used for measuring radiation dosage use either solid chips of the radiation activated TL phosphor mounted or encapsulated in a suitable material, or a layer of the phosphor crystals deposited on, sandwiched between or encapsulated in glass, plastic, and the like. Only the outer surface of such dosimeters is useful, because if the phosphor is in the form of a light opaque chip, only light emitted by the outer surface is transmitted by the phosphor when heated. While it is possible to grow some phosphors as single crystals, their manufacture and use is not considered practical. In the case of a layer of phosphor crystals, the microcrystalline size of the phosphor particles makes them light scattering. This means that no matter how thick the phosphor layer is, it is still primarily only the crystals on the outer surface which are useful, since light emitted by phosphor crystals behind the outer layer is scattered and very little is emitted out of the dosimeter and received by the light detector. That is, due to the light scattering characteristics of these microcrystalline phosphors, light that is generated within the volume of the phosphor and light generated by particles behind surface particles has a much smaller probability of reaching the light detector than does light generated at or near the surface. Thus, the mount of emitted TL light, or TL signal as it is called, that can be collected by a light detector is very limited for a given outer surface area of the dosimeter no matter how thick the phosphor layer or material is. Thus, the light detection and collection efficiency of TL phosphor powders or chips is severely limited which consequently limits their sensitivity and usefulness. On the other hand, light generated within the volume of a transparent glass phosphor has a greater probability of being detected, resulting in an overall improvement in the efficiency of the phosphor. As mentioned above, TL glasses have been studied, but are not practical to use due to problems including cryogenic readout temperatures, early saturation and low sensitivity compared to crystalline phosphors. TL phosphors such as ZnS and LiF are destroyed by exposure to moisture.

In marked contrast, a TL dosimeter of the invention is not so limited, because it is a composite material which comprises a nanocrystalline thermoluminescent phosphor dispersed within a continuous, optically transparent matrix, and preferably a glassy matrix. The nanocrystalline size of the phosphor particles avoids the problems of scattering the TL emitted light or signal of prior art phosphors. This property, combined with an optically transparent matrix, results in an optically transparent dosimeter in which the TL signal or light emitted by the nanocrystalline phosphor particles has a greater probability of being detected, even for light emitted by phosphor particles removed from the surface of the dosimeter. This means that increasing the thickness or size of the dosimeter of the invention increases its sensitivity, collection efficiency and TL emission, thereby extending its lower limit of sensitivity and enabling it to be used for applications in which prior art phosphors are not sensitive enough to be used. The optically transparent dosimeters of the invention can be made in arbitrary shapes and sizes. Further, and as set forth above, a dosimeter of the invention in the form of a flat sheet or plate with parallel faces is useful for detecting $\alpha$ and $\beta$ particle radiation. These particles do not penetrate deeply into the dosimeter, but because of the optical transparency, TL light generated near the surface is trapped by total internal reflection and guided to the edges of the sheet for photo detection. The TL light guided to the edges of the dosimeter is much more concentrated and easier to detect than TL light emitted from the flat face of the dosimeter. Concentrating and detecting generated TL light at the edges of the flat dosimeter can only be accomplished with a light transparent dosimeter. In the form of a fiber, the dosimeter can be attached directly to an optical fiber and the TL signal transmitted over long distances. Besides the advantages of a composite TL dosimeter of the invention eliminating many of the problems associated with prior art dosimeters by being optically transparent, the phosphor itself is protected from possible deleterious effects of the surrounding environment because it is effectively sealed in the glassy matrix.

TL phosphors useful in the practice of the invention include any inorganic TL material which can be made into nanocrystalline size particles and which can be made in or dispersed into a light transparent matrix, such as a glass, which does not adversely interfere with either the UV or ionizing radiation, or the emitted TL signal. Generally these include Group $II_A$, $II_B$, $VI_A$, $VI_B$ and II–VI semiconductors. Illustrative, but non-limiting examples of TL phosphors suitable for use in the practice of the invention include zinc sulfide (ZnS), doped with one or more activating metal ions such as Cu (ZnS:Cu), Mn, Ag, Pb and Eu. Mn ion doped ZnS emits yellow light or TL signal, while the TL signal for Ag doped ZnS is bluish and that for Eu (2+) is a deep blue luminescence compared to the blue green luminescence observed for ZnS:Cu in a dosimeter of the invention. That the Eu doped ZnS phosphor emits a bluish TL signal is unusual, because a Eu doped ZnS phosphor usually emits a red TL signal. Lithium fluoride (LiF), doped with one or more activating metal ions such as Ti and Mg (LiF:Ti,Mg) and also Cu or P. Lithium borate doped with Mn ion ($Li_2B_4O_7$:Mn) is known to be useful for X-ray and neutron detection. Also useful are SrS, BaS, GaS, $CaF_2$ doped with Mg or rare earth metal ions, alkali metal sulfates doped with Cu such as $CaSO_4$ doped with one or more of Cu, Dy or Th ions, and MgS doped with one or both of Eu and Sm as activating metal ions. Still other useful TL phosphors include alkali metal halides doped with lanthanide metal ions such as Eu as an activator metal ion. An example of this latter group is KCl:Eu. Those skilled in the art know and appreciate that the convention of expressing an activator metal ion doped phosphor, such as copper activated zinc sulfide or ZnS:Cu, means that while there equal atomic mounts of Zn and S in the ZnS crystal, the amount of activating Cu ion is present in minute mounts as a dopant and therefore it does not mean that there is one atom of Cu ion present for each atom of Zn and S.

As set forth above, an important aspect of the invention relates to determining the amount of ionizing radiation present in a particular environment or at a particular location by exposing a dosimeter of the invention to such radiation for a predetermined period of time, followed by heating the irradiated dosimeter to produce a TL signal which is detected and measured, wherein the strength of the measured signal is directly related to the absorbed dose of the radiation to which the dosimeter has been exposed. By ionizing radiation is meant to include any form of electromagnetic or particle radiation which can cause filling of TL traps via the generation of electron-hole pairs in the phosphor which, when subsequently heated emits light or TL signal. Strong ionizing radiation such as X-rays and $\gamma$-rays promotes an electron from the valence band into the conduction band by a high energy photon. Some of the excited electrons and so-formed holes migrate to trap sites which are later released by applying thermal energy. UV radiation, while not strong enough to create electron-hole pairs, generates TL traps by other mechanisms. Illustrative, but non-limiting examples of ionizing radiation which a dosimeter of the invention is useful for detecting and measuring therefore, include radiation in the ultraviolet (UV) portion of the electromagnetic spectrum, X-rays, alpha, gamma and beta radiation, and neutrons.

UV dosimetry is becoming increasingly important for protecting personnel from eye and skin damage. A dosimeter of the invention has been found to be useful for measuring UV radiation (as well as the much stronger X- and $\gamma$-radiation) without the need for any prior pretreatment. This is surprising, in that pretreatment is generally a prerequisite to obtaining a useful degree of sensitivity. Traditional TL dosimeters used for monitoring ionizing radiation according to the prior art methods are often powders or pressed chips of inorganic material, such as calcium fluoride or lithium fluoride doped with activating metal ions, and require preconditioning techniques such as preirradiation with high doses of $\gamma$-rays or preheating at high temperature to obtain sufficient UV sensitivity. A dosimeter of the invention comprising metal-ion activated ZnS nanocrystals has been found to be useful for monitoring UV exposure without the need for any pretreatment.

A TL dosimeter of the invention can be made by impregnating a porous glass or glassy matrix with one or more solutions of reagents which form the nanocrystalline phosphor or phosphor precursor in the pores of the glass, followed by suitable heat treatment, if necessary, to chemically activate the metal ion or ions to form the completed phosphor in the pores of the glass. This is followed by heating the composite below or near the sintering temperature of the glassy matrix to partially sinter the glass, thereby partly densifying or consolidating it and sealing in the nanocrystalline phosphor. This also seals off the phosphor from the surrounding environment which is particularly beneficial in the case of phosphors which are adversely affected by moisture, such as ZnS and LiF phosphors. By partially densifying or consolidating the porous glassy matrix, what is meant is heating it up to a temperature and for a time sufficient to seal the pores off from one another, but not enough to collapse all of the pores and thereby destroy the phosphor within. In general this means that during the sintering or consolidation process the glass matrix is heated to a temperature of no greater than 1050°–1150° C. A hold time of about 4 hours at this temperature has been found sufficient. Subsequent heat treatment of the finished composite may be required before using it as a TL dosimeter to insure that no TL traps are filled in the material prior to its use.

The size or diameter of the pores in the glassy matrix limits the maximum dimension of the phosphor crystals in two dimensions. For example, a commercially available porous glass suitable for use in fabricating the composite dosimeter of the invention is Corning type 7930 Vycor® glass which has an interconnecting network of pores or tunnels in which the maximum diameter is about 40 Å. This thus limits the maximum dimension of the nanocrystalline phosphor formed in the pores to 40 Å in two directions. However, it is possible for some crystals to grow along the longitudinal axis of the pores and interconnect which can make their overall size too large and reduce the optical transparency of the glass. This is prevented by the techniques used to form the crystals in the pores. For example, in forming a ZnS phosphor in such pores, controlling the concentration of the solutions results in small, discrete crystal particles whose size does not exceed about 40 Å. Other methods for forming the nanocrystalline phosphors in such pores include chemical vapor deposition (CVD).

As mentioned above, sealing the phosphor in the glass protects it from the potentially destructive effects of the surrounding environment and provides a dosimeter that is easy to handle, size and use. For example, ZnS and metal ion activated ZnS phosphors are known to be moisture sensitive and efforts have been made to encapsulate such phosphors to prevent moisture degradation as is disclosed in, for example, U.S. Pat. No. 5,220,243 in which a ZnS phosphor is coated with a hydrolyzed alkylaluminum compound as a moisture barrier to provide a less moisture sensitive material. In one embodiment of the invention a composite of the invention is made using a porous Vycor® glass, such as Corning type 7930. This is a silicate glass of the type $Na_2O$—$Al_2O_3$—$B_2O_3$—$SiO_2$ which has been acid leached to dissolve out the major portion of the boron oxide and alkali which leaves an insoluble, highly siliceous, monolithic porous skeleton in which the pore sizes are on the order of 40 angstroms. Glass of this type, its properties and method for making is disclosed, for example, in U.S. Pat. No. 2,286,275. The porosity of the 7930 Vycor glass is in the form of interconnecting pores or tunnels having an average diameter on the order of about 40 Å. In this case, the size of the pores limits the effective size of the nanocrystalline TL phosphor formed in the pores to an average diameter of about 40 Å. Other glasses or glassy materials may be used such as sol-gel glasses formed from alkoxide and other precursors of silica, alumina and titania. Undoped Vycor glass has been found to yield negligible thermoluminescence, with only a weak glow peak at ~150° C. observed, despite the presence of aluminum. The term "glass" in the context of the practice of the invention is meant to include any suitable, light transparent, material which is not adversely effected by the UV or ionizing radiation and which can be fabricated into a dosimeter of the invention. "Light transparent" is also meant to include transparent to the TL wavelengths emitted by the dosimeter and at least partially transparent to UV radiation for the embodiment in which the dosimeter is to be used for monitoring exposure to UV radiation as is discussed in Example 8. Greater UV transparency of the host glass is a desirable characteristic for UV dosimetry.

In using a dosimeter of the invention for detecting and recording the absorbed dosage of UV or ionizing radiation, the phosphor is typically first heated to insure that no traps are initially present. The dosimeter is then placed in the environment in which it is desired to detect and record the radiation for a period of time which is determined from experience. After exposure to the radiation, the irradiated dosimeter is heated at a predetermined rate and the TL light or signal emitted by the dosimeter is photometrically detected, recorded and compared to TL signals obtained for known dosages to determine the absorbed dose as is well known to those skilled in the art.

The invention will be further understood with reference to the examples below.

EXAMPLE 1

In this example a TL dosimeter of the invention was made using porous Vycor glass rods (Corning Glass 7930) as the continuous, glassy matrix host material. The average pore size in the glass is about 40 Å, with the composition being about 96% silica, 3% boron oxide and less than 1% aluminum oxide. The glass rods were used as received, without any treatment. The Vycor glass rods, having a 0.28 inch outer diameter, were immersed in an aqueous solution of zinc nitrate at a concentration of 0.1 g/100 ml and copper (cuprio) sulfate at a concentration of 0.01 g/100 ml until the solution was completely diffused throughout the pores of the glass, after which an aqueous solution of thioacetamide was added and the formation of ZnS nanocrystals in the pores of the glass was allowed to proceed for several hours at a temperature of 30° C. The thioacetamide solution was at a concentration of 1 g/100 ml and contained 1 ml/100 ml of concentrated nitric acid. The porous glass containing the so-formed nanocrystalline ZnS was then removed from the solution and dried overnight in a vacuum oven at 100° C. In an alternate procedure, the glass rod containing the infiltrated zinc nitrate/copper sulfate solution may be dried and then contacted with $H_2S$ gas to form the ZnS crystals. After drying the glass was heated at 1000° C. in air for several hours to chemically activate the copper ions and form the nanocrystalline, copper-activated, zinc sulfide phosphor ZnS:Cu. The heat treatment also at least partially collapsed the porous glass matrix (a process referred to as densification or consolidation), thereby sealing the ZnS:Cu nanocrystals inside the glass. Optical absorption spectroscopy revealed that the average size of the ZnS:Cu crystals in the pores of the glass was on the order of about 20 Å. The rods were then cut into wafers 0.020 inches thick weighing an average of 34 mg using a diamond saw. The wafers were preannealed by heating to 400° C. over a period of several minutes in a Harshaw 2000 A/B TLD reader, held there for several seconds and then permitted to cool down to room temperature to insure that no traps were initially filled in the glass. The wafers were then wrapped in aluminum foil, since it had been determined that the nanocrystalline ZnS:Cu exhibited a TL signal when exposed to UV radiation as illustrated in Example 6 below.

Glass wafers containing the nanocrystalline ZnS:Cu phosphor and wrapped in aluminum foil prepared according to the above procedure were irradiated by a calibrated $^{60}Co$ source that provided 3 Gy/h at a distance of 139 cm. The total dose received by each wafer was controlled by the duration of the exposure. The TL glow curves were read using a Harshaw model 2000-A/B TL readout system. All measurements were obtained with a Corning 5-61 red cutoff filter between the sample planchet and the S-11 photomultiplier tube (PMT). The model 2000-B electronics provided the high voltage power to the PMT as well as the signal to ramp the temperature of the sample (10° C./min.). The output of the PMT was directed to a picoammeter (Keithly model 410A) and the analog output of the picoammeter was subsequently digitized with a signal processor (EG&G 4400 system). The temperature of the sample was monitored using the temperature reference output of the 2000-A detector and was calibrated using a thermocouple spot welded to a sample planchet. The digitized curves were easily manipulated in order to adjust the temperature axis and integrate the signal. For the UV radiation experiments, wavelength dependent UV dosimetry measurements were performed between 240 and 300 nm using a deuterium lamp and a double monochromator.

A typical glow curve of the ZnS:Cu dosimeter of the invention irradiated with the $^{60}Co$ source is shown as the solid curve in FIG. 1. This curve was obtained using the composite nanocrystalline ZnS:Cu phosphor/glass matrix dosimeter wafer prepared above and dosed to 2 Gy and read within one day of irradiation. The characteristic shape of this glow curve was found to be independent of the dose for all doses studied (1 mGy to 10,000 Gy). As seen in FIG. 1, the glow curve consists of two broad peaks, the first occurring at 160° C. and the higher temperature peak at 220° C. All of the traps were depleted and the TL light or signal read out by the time the temperature reached 350° C. Broad glow peaks or bands are typical of TL originating from a glass host due to the broad distribution of trap energies present in the noncrystalline glass. However, the evolution of the TL glow curve with time is not complicated.

COMPARATIVE EXAMPLE A

In order to assess the potential utility of the dosimeter of the invention made in Example 1 above for dosimetry applications, the TL of the dosimeter of the invention was compared to that of a widely used LiF dosimeter, TLD-100 which is a Ti ion and Mg ion activated lithium fluoride (LiF:Ti,Mg). Accordingly, a TLD-100 dosimeter chip weighing about 25 mg was simultaneously dosed with 2 Gy at the same time as the ZnS:Cu dosimeter of the invention and the TL glow curves of both dosimeters are shown in FIG. 1. In contrast to the simple TL glow curve of the dosimeter of the invention, the glow curve for the prior art TLD-100 dosimeter shown as the dotted line in FIG. 1 consists of several narrow glow peaks, with the most intense located at 190° C.

EXAMPLE 2

Figure 2:
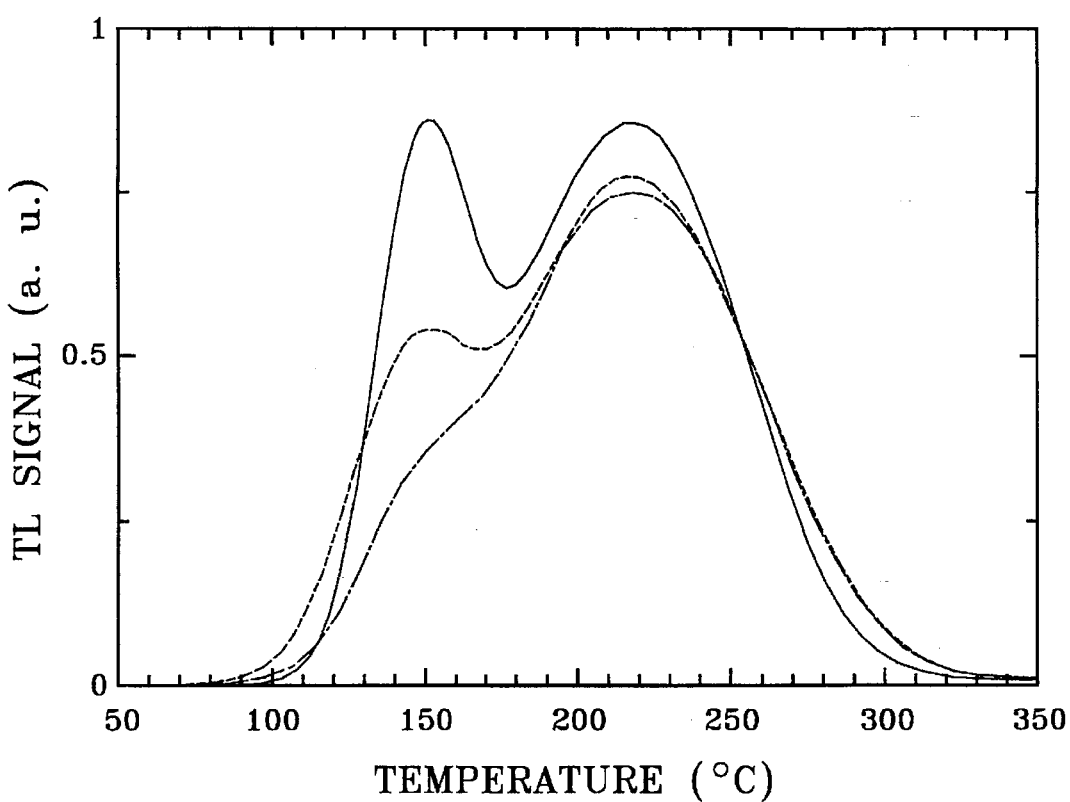
FIG. 2 illustrates the fading behavior of a TL dosimeter of the invention.

A room temperature tiding study was performed to determine the persistence of the high and low temperature glow peaks. Three of the dosimeters of the invention made according to Example 1 were simultaneously exposed to a dose of 10 Gy, with TL measurements of the irradiated dosimeters made one, three and fourteen days after irradiation. The resulting TL glow curves are shown in FIG. 2. The TL curve read one day after radiation exposure is shown as the solid curve. The dashed curve is that read after three days and the dot-dash curve fourteen days after irradiation. As seen from this Figure, initially the high and low temperature bands were similar in magnitude, but as expected, the low temperature band decayed over a period of days, while the high temperature band persisted with little change.

Figure 3:
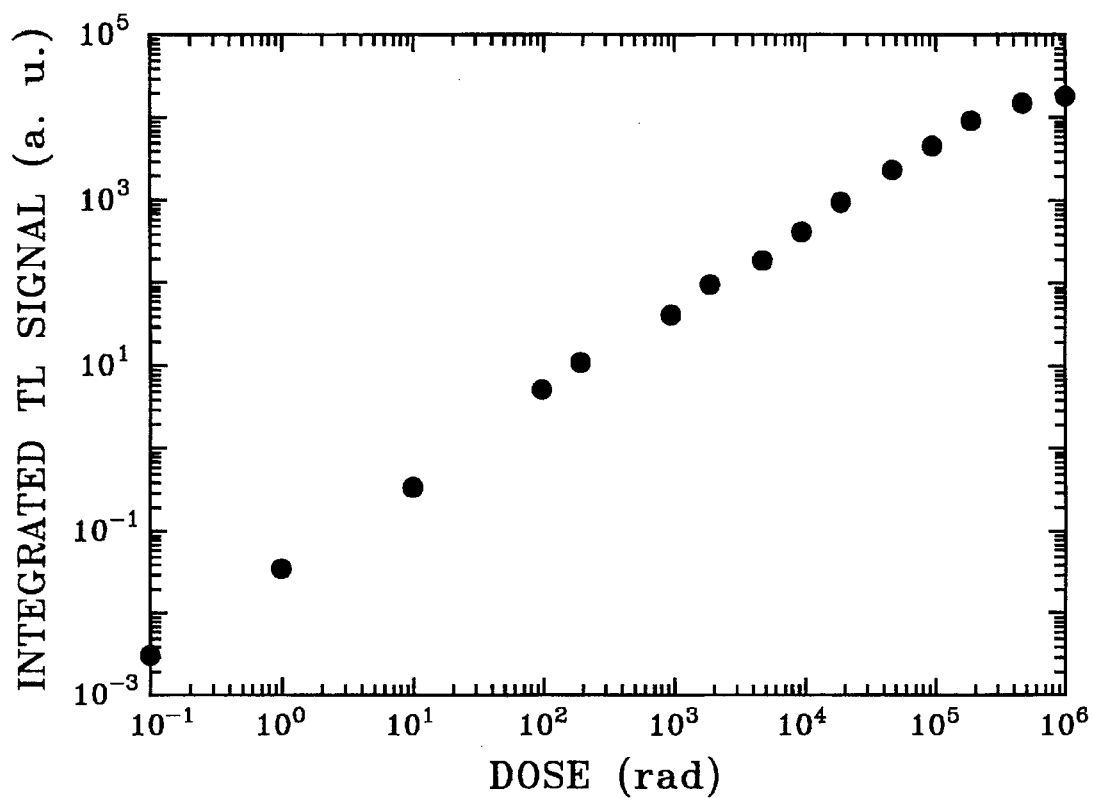
FIG. 3 is a graph of the integrated TL signal of a TL dosimeter of the invention.

EXAMPLE 3

γ-ray dose dependence measurements were made using dosimeters prepared according to Example 1 to determine if the TL response of the dosimeter is linear over a wide range of doses. TL glow curves were measured for the dosimeters of the invention exposed to γ-radiation from the $^{60}$Co source at doses ranging from 1 mGy to 10,000 Gy. The integrated TL signal vs. dose is plotted in FIG. 3. Each data point represents the TL output from a single dosimeter of the invention read between one and fourteen days after irradiation. As the Figure shows, there is a substantially linear relationship between the TL output and the dose over a range of almost six orders of magnitude. From these results it can safely be said that increasing the mass of the dosimeter by tenfold will extend the lower limit of sensitivity to 100 μGy.

EXAMPLE 4

A radiation dosimeter of the invention comprising a nanocrystalline Ti ion and Mg ion activated LiF phosphor in a monolithic glassy matrix is prepared by dissolving LiF in water slightly acidified with $HNO_3$ to increase the solubility of the LiF. The solution also contains a small amount of Mg from the water soluble salt $MgI_2$ and Ti metal to provide the Ti. A porous glass body made from a glass such as the Corning 7930 glass is immersed into the solution and the solution is allowed to diffuse into the pores throughout the glass. The glass is then removed from the solution and allowed to dry, thereby resulting in a precursor of the dosimeter of the invention which comprises nanocrystalline crystallites of LiF, $MgI_2$ and a Ti salt dispersed throughout the pores of the Vycor glass. The precursor is then placed inside a fused silica tube open at one end which is evacuated and then sealed by melting the open end closed. The sealed tube is placed in a furnace and the temperature slowly raised to 1050° C. and held at that temperature for about four hours. After cooling, the sealed tube is opened to remove the dosimeter. The so-formed dosimeter is a composite of optically transparent glass containing nanocrystalline LiF crystallites doped with Mg ion and Ti ion.

EXAMPLE 5

In this example a TL dosimeter of the invention is prepared using a CVD technique in which a porous glass body, such as the Corning 7930 Vycor glass, is immersed into liquid $Zn(CH_3)_2$ or $Zn(CH_2CH_3)_2$. The liquid organozinc compound diffuses into the pores throughout the glass and the glass then removed from the solution and heated to about 300° C. in the presence of $H_2S$ gas to form nanocrystalline ZnS in the pores. After this the composite is cooled and immersed into an aqueous solution of $CuSO_4$ which diffuses throughout the pores in the glass. The composite is removed from the solution, dried and placed in a furnace which is heated to about 1050° C. to drive the Cu into the ZnS nanocrystallites and form the nanocrystalline ZnS:Cu phosphor in the glass matrix and also serves to at least partly sinter and consolidate the porous glass matrix, thereby sealing in the ZnS:Cu phosphor.

EXAMPLE 6

Figure 4:
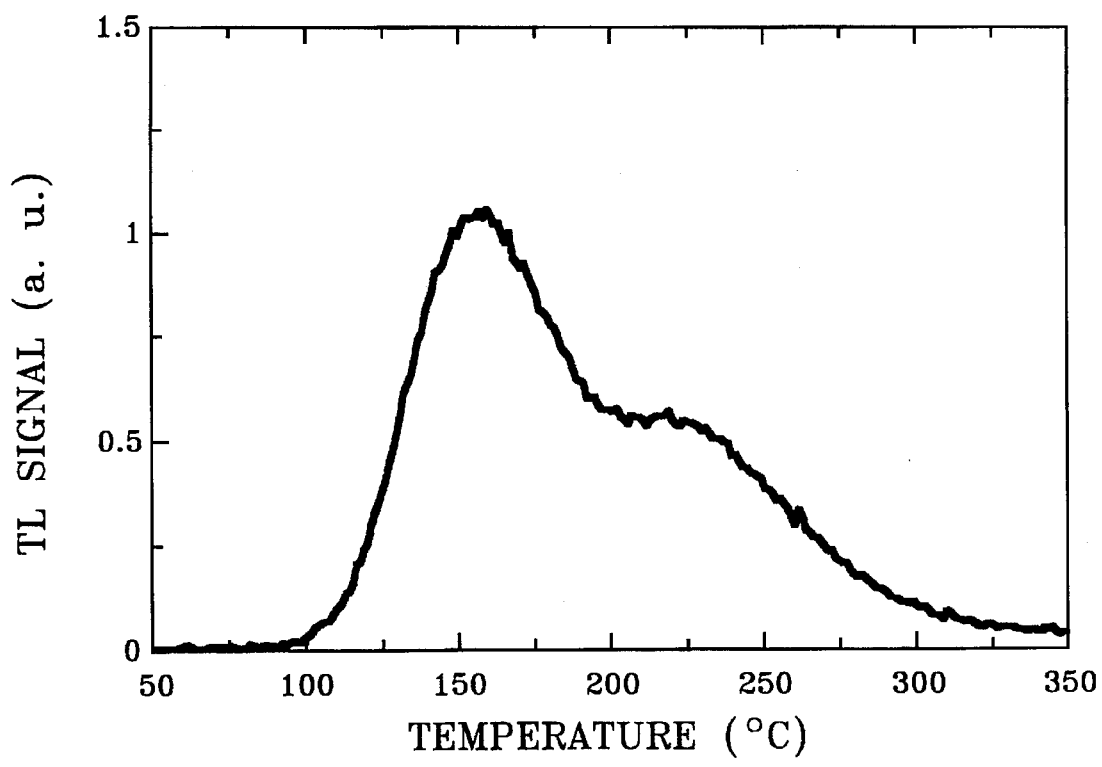
FIG. 4 is a glow curve of a TL dosimeter of the invention which was exposed to UV radiation.

Dosimeters comprising nanocrystalline ZnS:Cu-glass composite identical to those prepared in Example 1 and annealed for a few seconds at 400° C. were exposed to unfiltered UV radiation emitted from a Hg arc lamp which emitted 44 μW/cm$^2$ measured at a distance of 30 cm from the lamp. The dosimeters were placed a distance of 15 cm from the lamp. The TL glow curves of the irradiated dosimeters were measured using the same equipment and technique as that used in Example 1 for the dosimeters irradiated by the γ-radiation from the $^{60}$Co source. A typical TL glow curve for a UV irradiated dosimeter of the invention is illustrated in FIG. 4 and consists of two peaks, one at 160° C. and a higher temperature peak at 220° C. The dosimeter had been exposed to the UV radiation for 50 s and the glow curve read 24 hours after exposure to the UV radiation. The temperatures of the glow peaks are identical to those obtained using the γ-radiation. However, the ratio of the peak heights is different, with relatively deeper (higher temperature) traps populated by the γ-ray excitation as one would expect.

EXAMPLE 7

Figure 5:
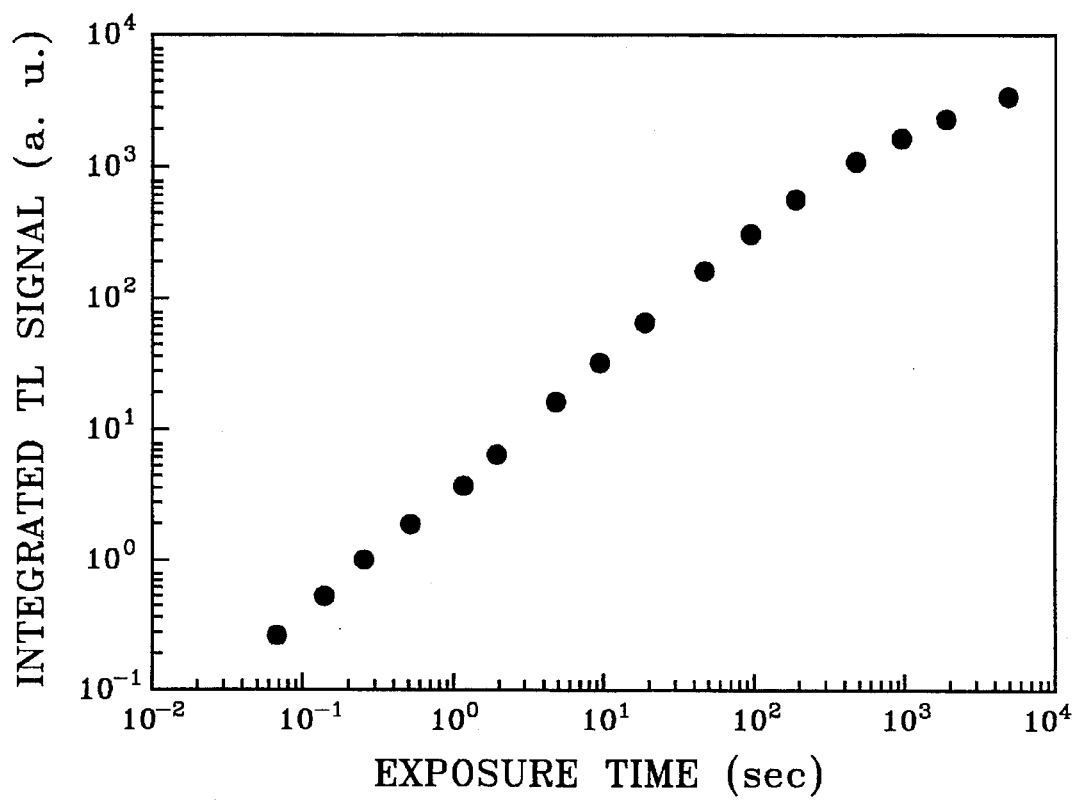
FIG. 5 illustrates the integrated TL response of a TL dosimeter of the invention as a function of exposure time to UV radiation.

The UV dose dependence of the nanocrystalline ZnS:Cu-glass composite dosimeters of the invention used in Examples 1 and 6 was determined from the glow curves as a function of the duration of UV exposure. FIG. 5 is a plot of the integrated TL signal as a function of exposure duration, with each data point representing the TL output from a single dosimeter measured 15 min after the end of the UV exposure. FIG. 5 shows a very linear relationship between the TL output and the dose from about 0.1 μJ/cm$^2$ to almost 10,000 μJ/cm$^2$. The relationship between the peak TL signal and the dose is identical to the dose dependence of the integrated signal. Repeated exposure of a single dosimeter indicated that the dosimeter can be used reliably and reproducibly for at least dozens of times, but no effort was made to determine the limit. It suffices to say that the same dosimeter exhibited excellent reproducible results when dosed hundreds of times with the $^{60}$Co γ-rays. Accordingly, it is only reasonable to expect no less from the same dosimeters used to determine exposure to the less severe and destructive UV radiation.

EXAMPLE 8

Figure 6:
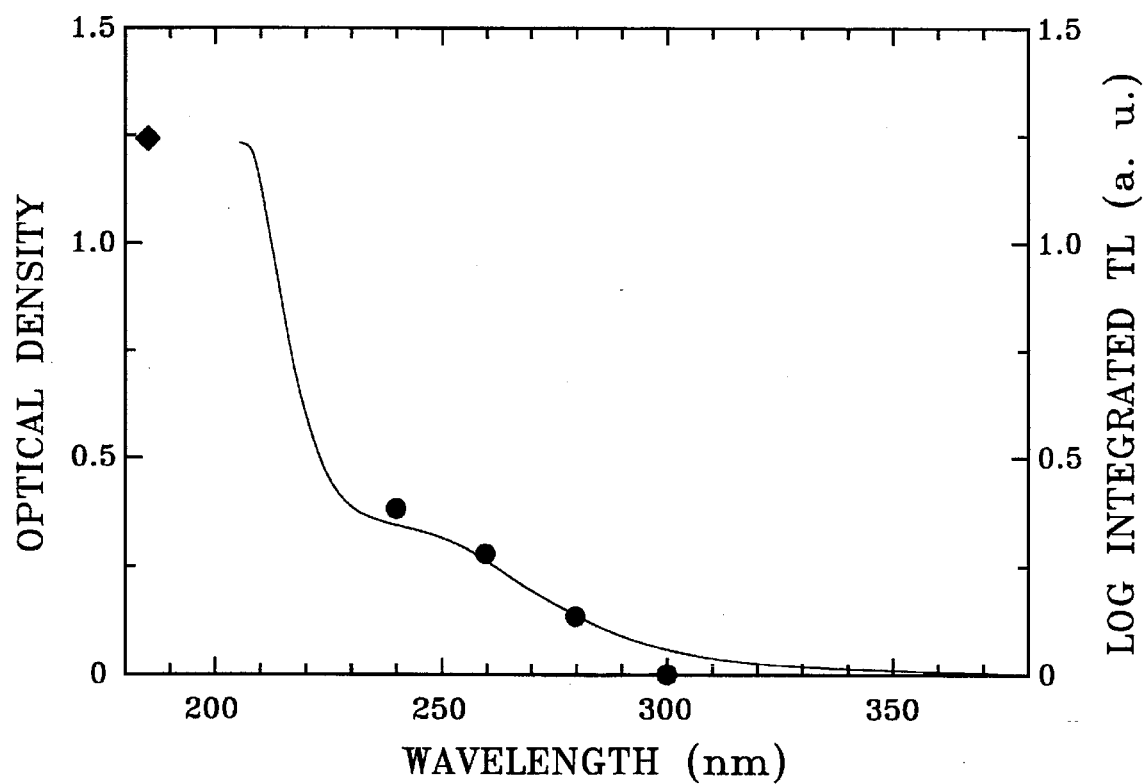
FIG. 6 graphically illustrates both the UV/visible absorption spectrum and the log of the integrated TL signal measured at several wavelengths after exposure to UV radiation.

FIG. 6 is a graph of the UV/visible absorption spectrum of 0.05 cm thick ZnS:Cu-glass composite dosimeter of the previous examples shown as the solid curve. The circles are the log of the integrated TL signal measured at several UV wavelengths (deuterium lamp) after exposure to a 0.28 mJ UV dose. The diamonds are the log of the integrated TL signal at 185 nm from the low pressure Hg lamp after exposure to a 0.28 mJ dose. This Figure shows that the dosimeters are essentially opaque for wavelengths lower than about 200 nm and transparent for wavelengths larger than about 300 nm. The wavelength dependence of the TL response correlates closely with the optical density of the dosimeter.

It is understood that various other embodiments and modifications in the practice of the invention will be apparent to, and can be readily made by, those skilled in the art without departing from the scope and spirit of the invention described above. Accordingly, it is not intended that the scope of the claims appended hereto be limited to the exact description set forth above, but rather that the claims be construed as encompassing all of the features of patentable novelty which reside in the present invention, including all the features and embodiments which would be treated as equivalents thereof by those skilled in the art to which the invention pertains.

What is claimed is:

1. A method for detecting the presence of radiation in an environment in which radiation is present, said method comprising:

placing a thermoluminescent radiation dosimeter in said environment for a predetermined period of time, removing said irradiated dosimeter from said environment and then heating said irradiated dosimeter so that it emits thermoluminescent light of an intensity indicative of the absorbed dose and determining the absorbed dose from said emitted light, wherein said dosimeter comprises nanocrystalline thermoluminescent phosphor particles dispersed throughout a light transparent, glassy matrix.

2. A method according to claim 1 wherein said phosphor comprises a phosphor which, when heated after being exposed to ionizing radiation, emits thermoluminescent light, the intensity of which is indicative of the absorbed dose.

3. A method according to claim 2 wherein said nanocrystalline particles are present in pores in said glassy matrix.

4. A method according to claim 3 wherein said radiation comprises UV or ionizing radiation.

5. A method according to claim 4 wherein said radiation is selected from the group consisting essentially of UV, $\alpha$, $\beta$, $\gamma$ and X-radiation and neutron radiation.

6. A method according to claim 5 wherein said glassy matrix is partially consolidated to seal said nanocrystalline particles within.

7. A method according to claim 6 wherein said phosphor comprises Group $II_A$, $II_B$, $VI_A$, $VI_B$ and II–VI semiconductors.

8. A method according to claim 6 wherein said phosphor is selected from the group consisting essentially of ZnS, doped with at least one activating metal ions of Cu, Mn, Ag, Pb and Eu, LiF doped with at least one activating metal ions of Ti, Mg, Cu and P, $Li_2B_4O_7$:Mn, SrS, BaS, GaS, $CaF_2$ doped with Mg or rare earth metal ions, alkali metal sulfates doped with at least one of Cu, Dy or Th ions, MgS doped with one or both of Eu and Sm activating metal ions, and alkali metal halides doped with lanthanide metal ions.

9. A method according to claim 8 wherein said radiation consists of UV radiation.

10. A method for detecting radiation and determining absorbed dosage using a thermoluminescent dosimeter which comprises nanocrystalline thermoluminescent phosphor particles dispersed throughout a light transparent, glassy matrix, said method comprising the steps of:

(i) exposing said dosimeter to a radiation containing environment for a predetermined period of time;

(ii) removing the irradiated dosimeter from said environment;

(iii) heating said irradiated dosimeter to produce a thermoluminescent glow curve;

(iv) recording said glow curve and comparing it with glow curves obtained from a known radiation dose, and (v) determining the radiation dosage experienced by said dosimeter.

11. A method according to claim 10 wherein said phosphor comprises a phosphor which, when heated after being exposed to ionizing radiation, emits thermoluminescent light, the intensity of which is indicative of the absorbed dose.

12. A method according to claim 11 wherein said nanocrystalline particles are present in pores in said glassy matrix.

13. A method according to claim 12 wherein said radiation comprises UV or ionizing radiation.

14. A method according to claim 13 wherein said radiation is selected from the group consisting essentially of UV, $\alpha$, $\beta$, $\gamma$ and X-radiation and neutron radiation.

15. A method according to claim 14 wherein said glassy matrix is partially consolidated to seal said nanocrystalline particles within.

16. A method according to claim 15 wherein said phosphor comprises Group $II_A$, $II_B$, $VI_A$, $VI_B$ and II–VI semiconductors.

17. A method according to claim 15 wherein said phosphor is selected from the group consisting essentially of ZnS, doped with at least one activating metal ions of Cu, Mn, Ag, Pb and Eu, LiF doped with at least one activating metal ions of Ti, Mg, Cu and P, $Li_2B_4O_7$:Mn, SrS, BaS, CaS, $CaF_2$ doped with Mg or rare earth metal ions, alkali metal sulfates doped with at least one of Cu, Dy or Th ions, MgS doped with one or both of Eu and Sm activating metal ions, and alkali metal halides doped with lanthanide metal ions.

18. A method according to claim 17 wherein said radiation consists of UV radiation.

19. A method for detecting radiation in an environment in which said radiation is present, said method comprising placing a thermoluminescent radiation dosimeter in said environment for a predetermined period of time, removing said irradiated dosimeter from said environment and then heating said irradiated dosimeter so that it emits thermoluminescent light of an intensity indicative of the absorbed dose and determining the absorbed dose from said emitted light, wherein said dosimeter is in the form of a flat plate with parallel faces and comprises nanocrystalline thermoluminescent phosphor particles dispersed throughout a light transparent, glassy matrix, and wherein said emitted light is guided by total internal reflection to the edges of said dosimeter where it is detected.

20. A method according to claim 19 wherein said radiation is $\alpha$ or $\beta$ radiation.

21. A thermoluminescent dosimeter which comprises nanocrystalline thermoluminescent phosphor particles dispersed throughout a light transparent, glassy matrix in the form of a flat plate with parallel faces, whereby thermoluminescent light emitted by said dosimeter is guided by total internal reflection to the edges of said dosimeter.

* * * * *